UNITED STATES PATENT OFFICE.

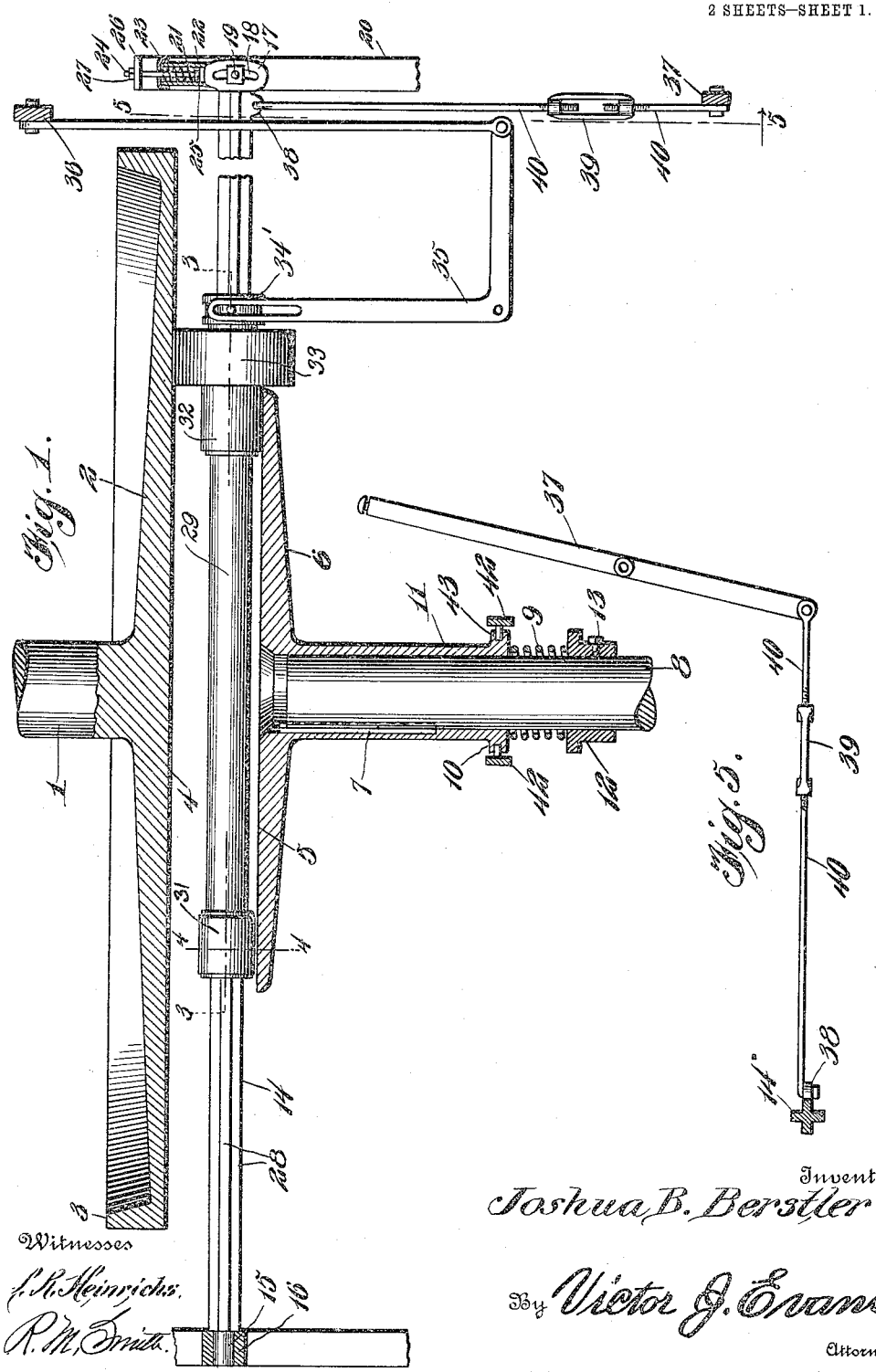

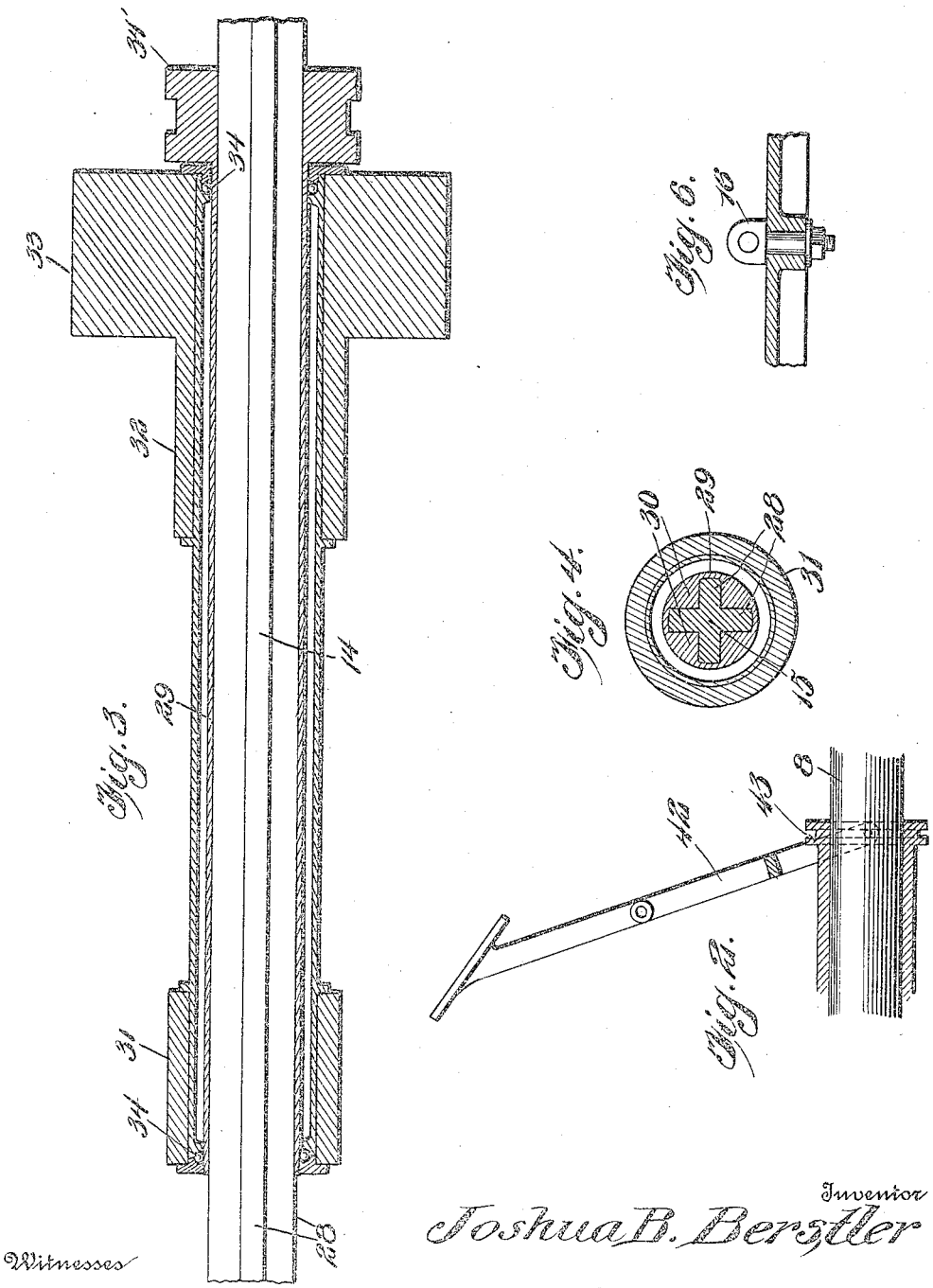

JOSHUA B. BERSTLER, OF MIDDLETOWN, PENNSYLVANIA.

FRICTION TRANSMISSION-GEARING.

1,129,629.  Specification of Letters Patent.  Patented Feb. 23, 1915.

Application filed March 4, 1914. Serial No. 822,465.

*To all whom it may concern:*

Be it known that I, JOSHUA B. BERSTLER, a citizen of the United States, residing at Middletown, in the county of Dauphin and State of Pennsylvania, have invented new and useful Improvements in Friction Transmission-Gearing, of which the following is a specification.

This invention relates to friction transmission gearing, the same being especially designed for use in connection with motor driven vehicles such as automobiles, motor trucks and the like, the object of the invention being to produce simple mechanism of the class referred to by means of which any desired speed may be obtained for driving the machine forward, the mechanism also providing for reversing the direction of rotation of the driven shaft so that the machine may be propelled in a backward direction.

A further object of the invention is to provide such a construction and arrangement of friction driving mechanism that the driving and driven shafts may be arranged exactly in line with each other thus economizing in space and simplifying the construction and also reducing to a corresponding extent the cost of manufacture.

With the above and other objects in view, the invention consists in the novel construction, combination and arrangement of parts, as will hereinafter be more fully described, illustrated and claimed.

In the accompanying drawings:—Figure 1 is a sectional view of the transmission gearing, said section being taken diametrically of the driving and driven friction disks and their shafts. Fig. 2 is a section taken at right angles to Fig. 1 showing the foot lever and connections for shifting the friction driven disk. Fig. 3 is a section on the line 3—3 of Fig. 1. Fig. 4 is a cross section on the line 4—4 of Fig. 1. Fig. 5 is a detail vertical longitudinal section on the line 5—5 of Fig. 1 illustrating the means for shifting the supporting shaft and transmission shaft laterally with respect to the driving disk. Fig. 6 is a fragmentary section showing the mounting of the bearing for the supporting shaft of the friction pinions.

Referring to the drawings 1 designates the driving shaft which in automobile and motor truck construction will constitute the crank shaft of the engine or an extension of said shaft. The shaft 1 carries a friction driving disk 2 which rotates therewith and is constantly driven thereby as long as the engine is in operation. This friction driving disk 2 is provided with a marginal rim 3 with which any suitable starting mechanism may be associated and said disk may also constitute the fly-wheel of the engine. The friction disk embodies a flat working friction face 4 which is arranged opposite and in parallel relation to a corresponding flat friction or working face 5 of a friction driven disk 6 which is splined as shown at 7 to a driven shaft 8 which in automobile practice extends rearwardly to the driving axle to which it is geared, the shaft 8 being usually provided with a universal joint between the ends thereof. The disk 6 rotates constantly with the shaft 8 to which it is keyed as shown and is also capable of being slid lengthwise of the shaft 8, the disk 6, however, being normally pressed toward the disk 2 by means of a coiled expansion spring 9 which is interposed between a collar 10 on the extended hub or sleeve 11 of the disk 6, and a stationary collar 12 on the shaft 8, the collar 12 being, however, adjustable by means of a binding screw 13 so that the pressure of the spring 9 against the collar 10 may be regulated to give the desired frictional contact between the friction elements by which the motion of the shaft 1 is transmitted to the shaft 8.

A non-rotating supporting shaft 14 extends in a plane substantially at right angles to the plane of the shafts 1 and 8 and between the disks 2 and 6 and has one end thereof reduced as shown at 15, such reduced end being received in a bearing socket 16 secured to the machine frame and permitting the other end of the shaft to be moved laterally. At its opposite end the shaft 14 is formed with a slotted extension or expanded end portion 17 provided with a slot 18 through which passes a bolt 19 connected with the machine frame a part of which is shown at 20. Extending laterally with relation to the shaft 14 and connected to the extension 17 is a tension device embodying a spring 21 contained in a spring casing 22 which is attached directly to the extension 17. The end of the casing 22 is closed by a threaded cap 23 and a rod or stem 24 extends through the cap 23 and is provided with a head 25 at the inner end thereof between which and the cap 23 the spring 21 is confined. The rod or stem 24 passes through a guide lug 26 on the frame 20 and is threaded to receive a nut 27. The function of the spring 21 is to hold the adjacent end of the shaft 14 toward the driving disk 2 and yet permit said shaft to yield away from said disk for a purpose which will appear.

The shaft 14 is irregular in cross section as illustrated in Fig. 4 where it is shown as substantially star-shaped or provided with a number of ribs 28 radiating from a common center. Surrounding the shaft 28 is a slidable sleeve 29 provided with inwardly extending ribs 30 which fit between the ribs 28 of the shaft 14. The sleeve 29 carries three friction elements, 31 designating the friction driving pinion, 32 the friction reversing pinion and 33 the friction transmission wheel. Each of these friction elements 31, 32 and 33 is preferably mounted upon anti-friction ball-bearings 34 as shown in Fig. 4. The body of each of said elements is composed of any suitable friction material, the pinions 31 and 32 operating in contact with the driven disk 6 and the wheel 33 operating in contact with the driving disk 2. All of said friction elements 31, 32 and 33 are shiftable simultaneously with the sliding sleeve 29, the means for shifting said sleeve and the friction elements carried thereby embodying a grooved collar 34' at one end of the sleeve 29, said collar 34' having a shifting lever 35 coöperating therewith and operatively associated by means of interposed connections with a manually controlled lever 36 within reach of the operator in his seat on the machine.

37 designates a hand lever operatively associated by means of interposed connections with a lug 38 on the movable end of the shaft 14 for throwing the wheel 33 out of engagement with the driving disk 2. A turn buckle 39 on the rod 40 which connects with the shaft 14 provides for adjusting the amount of throw necessary to shift the shaft 14 laterally, the rod 40 being connected with the emergency brake lever 37 in such manner that when the emergency brake is applied by means of said lever, the frictional contact between the wheel 33 and the driving disk 2 is broken so that the engine will no longer continue to drive the shaft 8.

The pinion 31 is smaller in diameter than the reversing pinion 32 and therefore only one of said pinions may come in contact with the working face 5 of the disk 6 at the same time. By shifting the sleeve 29 to the right or left lengthwise of the shaft 14, the pinion 31 may be moved toward and away from the center of the driven disk 6 so as to obtain any desired speed for the driven shaft 8. At the same time the wheel 33 is correspondingly moved away from and toward the center of the driving disk 2. In order to reverse the driving mechanism, the sleeve 29 is thrust toward the left hand side of Fig. 1 to the limit of its movement so that the reversing pinion 32 will coöperate with the driven disk 6 and as said pinion 32 is of larger diameter than the pinion 31, the latter will be held out of driving contact with the disk 6. Preparatory to shifting the sleeve 29 and the friction elements carried thereby, the disk 6 is shifted by means of the usual foot lever 42 the forked end of which engages a groove 43 in the collar 10 above described.

It will be seen from the foregoing description taken in connection with the accompanying drawings that the driving shaft 1 and the driven shaft 8 are in line with each other. By shifting the sleeve 29 and the friction elements carried thereby lengthwise of the supporting shaft 14, any desired forward speed may be imparted to the shaft 8 and the shaft 8 may be reversed as to its rotation by shifting the pinion 32 into frictional engagement with the driven disk 6. Under any and all adjustments of the sleeve 29, the latter is driven by the disk 2. The driving connection between the engine and the running gear of the vehicle may be broken at three different points, by shifting the friction driven disk 6 away from the disk 2, by applying the emergency brake and thus shifting the wheel 33 away from the disk 2, and by shifting the driving pinion 31 to the center of the driven disk 6. The mechanism may be operated by inexperienced and nervous persons without danger of stripping the gears or injuring the mechanism in any way. For repair purposes the parts of the driving mechanism are easily accessible as they are not required to run in oil in a transmission case. Any desired speed ahead may be obtained and the machine may be backed or reversed. The relative size of the friction disks and the interposed friction elements 31, 32 and 33 may be varied in accordance with the desire of the manufacturer or to suit the conditions for which the vehicle is designed. The mechanism is also adapted for either right or left hand or central controls.

What I claim is:—

1. In friction transmission gearing, a driving shaft, a friction driving disk thereon, a driven shaft in line with the driving shaft, a friction disk on said driven shaft, a shaft extending at right angles to said driving and driven shafts and interposed between the driving and driven disks, a plurality of friction elements slidable along the last named shaft and coöperating with the working faces of the driving and driven disks, said interposed friction elements comprising a driving pinion, a reversing pinion, and a friction wheel all mounted for simultaneous movement lengthwise of the last named shaft.

2. In friction transmission gearing, a driving shaft, a friction driving disk thereon, a driven shaft in line with the driving shaft, a friction disk on said driven shaft, a shaft extending at right angles to said driving and driven shafts and interposed between the driving and driven disks, a plurality of friction elements slidable along the last named shaft and coöperating with the working faces of the driving and driven disks, said friction elements comprising a driving pinion, a reversing pinion, and a friction wheel, said pinions being adapted to engage the driven disk and said friction wheel being adapted to engage the driving disk, and manually controlled means for shifting the friction driven disk longitudinally of its shaft.

In testimony whereof I affix my signature in presence of two witnesses.

JOSHUA B. BERSTLER.

Witnesses:
OTIS O. SCHAEFFER,
L. SCOTT BRANDT.

Copies of this patent may be obtained for five cents each, by addressing the "Commissioner of Patents, Washington, D. C."